United States Patent
Karame et al.

(10) Patent No.: US 11,212,081 B2
(45) Date of Patent: Dec. 28, 2021

(54) METHOD FOR SIGNING A NEW BLOCK IN A DECENTRALIZED BLOCKCHAIN CONSENSUS NETWORK

(71) Applicant: NEC Laboratories Europe GmbH, Heidelberg (DE)

(72) Inventors: Ghassan Karame, Heidelberg (DE); Jens-Matthias Bohli, Leimen (DE); Wenting Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 196 days.

(21) Appl. No.: 16/487,114

(22) PCT Filed: Feb. 24, 2017

(86) PCT No.: PCT/EP2017/054417
§ 371 (c)(1),
(2) Date: Aug. 20, 2019

(87) PCT Pub. No.: WO2018/153486
PCT Pub. Date: Aug. 30, 2018

(65) Prior Publication Data
US 2021/0135854 A1    May 6, 2021

(51) Int. Cl.
*H04L 29/06*     (2006.01)
*H04L 9/08*      (2006.01)
(Continued)

(52) U.S. Cl.
CPC ............. *H04L 9/0825* (2013.01); *H04L 9/06* (2013.01); *H04L 9/085* (2013.01); *H04L 9/0847* (2013.01);
(Continued)

(58) Field of Classification Search
None
See application file for complete search history.

(56) References Cited

U.S. PATENT DOCUMENTS 9,569,623 B2 * 2/2017 Kocher ..................... H04L 9/16
2015/0356524 A1 12/2015 Pennanen
(Continued)

FOREIGN PATENT DOCUMENTS

CN    106407808 B    6/2018
JP    H06-43808 A    2/1994

OTHER PUBLICATIONS

Shultz, Brian L., "Certification of Witness: Mitigating Blockchain Fork Attacks," Undergraduate Thesis in Mathematics, Apr. 8, 2015, XP055398218.
Levin, Dave et al. "TrInc: Small Trusted Hardware for Large Distributed Systems," USENIX, Apr. 2, 2009, pp. 1-14, XP061010708.
Zhang, Ren, "Broadcasting Intermediate Blocks as a Defense Mechanism Against Selfish-Mine in Bitcoin," International Association for Cryptologic Research, vol. May 30, 2015:070622, May 29, 2015, pp. 1-7, XP061018606.
(Continued)

*Primary Examiner* — Maung T Lwin
(74) *Attorney, Agent, or Firm* — Leydig, Voit & Mayer, Ltd.

(57) ABSTRACT

A method for signing a new block of a blockchain of a distributed blockchain consensus network (DBCN), comprising a mining computing entity (MCE) and a node computing entity, includes the step of signing and/or encrypting of predefined MCE information by the MCE, using a secret key of a public key/secret key key pair of the MCE to obtain hidden information (HI). The new block is signed by the MCE using the secret key and block information comprising block height information to create a signature for the new block. In a case of at least one further signing of a different block with the respective same block height information by the MCE, reveal information is provided to reveal the HI to the DBCN by another node computing entity of the DBCN when the node computing entity has received two signatures comprising the same corresponding block height information.

12 Claims, 4 Drawing Sheets

(51) Int. Cl.
*H04L 9/06* (2006.01)
*H04L 9/32* (2006.01)

(52) U.S. Cl.
CPC ...... *H04L 9/3247* (2013.01); *H04L 2209/046* (2013.01); *H04L 2209/38* (2013.01)

(56) References Cited

U.S. PATENT DOCUMENTS

| 2016/0134593 | A1* | 5/2016 | Gvili | H04L 63/0428 |
| | | | | 713/170 |
| 2016/0218879 | A1 | 7/2016 | Ferrin | |
| 2016/0277374 | A1* | 9/2016 | Reid | H04L 63/101 |
| 2017/0034197 | A1 | 2/2017 | Daniel et al. | |
| 2017/0228731 | A1* | 8/2017 | Sheng | G06Q 20/401 |

OTHER PUBLICATIONS

Gervais, Arthur et al. "On the Security and Performance of Proof of Work Blockchains," IACR, Jun. 2016.

Karame, Ghassan O. et al. "Two Bitcoins at the Price of One? Double-Spending Attacks on Fast Payments in Bitcoin," CCS '12, Oct. 2012.

Buterin, Vitalik, "Slasher: A Punitive Proof-of-Stake Algorithm," Ethereum Foundation, Jan. 15, 2014.

Feige, Uriel et al. "Witness Indistinguishable and Witness Hiding Protocols," ACM STOC '90, May 1990.

Cramer, Ronald et al. "Proofs of Partial Knowledge and Simplified Design Witness Hiding Protocols," CRYPTO '94, Aug. 1994.

* cited by examiner

METHOD FOR SIGNING A NEW BLOCK IN A DECENTRALIZED BLOCKCHAIN CONSENSUS NETWORK

CROSS-REFERENCE TO PRIOR APPLICATION

This application is a U.S. National Phase application under 35 U.S.C. § 371 of International Application No. PCT/EP2017/054417, filed on Feb. 24, 2017. The International Application was published in English on Aug. 30, 2018, as WO 2018/153486 under PCT Article 21(2).

FIELD

The present invention relates to a method for signing a new block in a decentralized blockchain consensus network, 'DBCN', comprising a mining computing entity, 'MCE'.

The present invention further relates to a decentralized blockchain consensus network, 'DBCN', comprising at least one mining computing entity, 'MCE', and a node computing entity.

The present invention further relates to a computing entity, 'MCE', for signing a new block in a decentralized blockchain consensus network, 'DBCN'.

The present invention even further relates to a node computing entity in a decentralized blockchain consensus network, 'DBCN'.

The present invention further relates to a method for signing a new block of a blockchain in a decentralized blockchain consensus network, 'DBCN', by a mining computing entity, 'MCE'.

The present invention even further relates to a method for revealing hidden information in a decentralized blockchain consensus network, 'DBCN'.

The present invention even further relates to a non-transitory computer readable medium storing a program causing a computer to execute a method for signing a new block in a decentralized blockchain consensus network, 'DBCN'.

The present invention even further relates to non-transitory computer readable medium storing a program causing a computer to execute a method for signing a new block in a decentralized blockchain consensus network, 'DBCN', by a mining computing entity, 'MCE'.

The present invention further relates to non-transitory computer readable medium storing a program causing a computer to execute a method for revealing hidden information in a decentralized blockchain consensus network, 'DBCN'.

BACKGROUND

Proof-of-works are getting more and more important in information technology security. For example crypto-currencies like Bitcoin rely on proof-of-works to thwart the overproduction.

Bitcoin is a decentralized payment system and is currently gaining popularity as a digital currency; several businesses are starting to accept Bitcoin transactions. For instance, Bitcoins were used as a form of fast payment in a local fast-food restaurant.

Bitcoin is a Proof-of-Work (POW) based currency that allows users to "mine" for digital coins by performing computations. Users execute payments by digitally signing their transactions and are prevented from double-spending their coins (i.e., signing-over the same coin to two different users) through a distributed time-stamping service. This service operates on top of the Bitcoin Peer-to-Peer (P2P) network that ensures that all transactions and their order of execution are available to all Bitcoin users.

Bitcoin is increasingly used in a number of "fast payment" scenarios, where the exchange time between the currency and goods is short. Examples include online services, ATM withdrawals, vending machine payments and fast-food payments, where the payment is followed by fast (<30 seconds) delivery of goods. While Bitcoin PoW-based time-stamping mechanism is appropriate for slow payments (e.g., on-line orders with delivery of physical goods), it requires tens of minutes to confirm a transaction and is therefore inappropriate for fast payments. This mechanism is, however, essential for the detection of double-spending attacks—in which an adversary attempts to use some of her coins for two or more payments. Since Bitcoin users are anonymous and users (are encouraged to) hold many accounts, there is only limited value in verifying the payment after the user obtained the goods (and e.g., left the store) or services (e.g., access to on-line content).

Double-spending attacks may be launched in particular during a temporary fork until the Bitcoin network merges the forks and agrees on the total order of transactions.

At present, blockchain forking is the one of the main challenges for distributed consensus. It slows down the time for the network to reach consensus and reduces the efficiency of the system.

The original conventional Proof-of-Work consensus protocol or mining protocol as disclosed in the non-patent literature of Gervais, A., Karame, G. et al, "On the Security and Performance of Proof of Work Blockchains, available under https://eprintiacr.org/2016/555.pdf was criticized for its waste of energy for mining (as disclosed in the non-patent literature of Karame, Androulaki, & Capkun, 2012, Double-Spending Attacks on Fast Payments in Bitcoin. *Proceedings of the ACM Conference on Computer and Communications Security (CCS)*. Chicago, Ill., USA), miners have to invest computation resources to repeatedly perform hashing functions until the right parameters are found to make the block legitimate. Therefore, a further conventional blockchain was proposed using multiple virtual mining protocols such as Proof-of-Stake PoS and Proof-of-Elapsed-Time PoET. Instead of brute-forcing the next block with computation resources, a node here uses his virtual mining resources such as stakes PoS or random timer returned by its secure hardware PoET to mine the next block. However, since the mining process comes without much cost, the main risk in virtual mining is nothing-at-stake, i.e., a node that can mine multiple blocks at the same time in order to increase its chance among all miners so that one of its blocks will be finally included in the blockchain and thus gaining the reward. Consequently, mining multiple blocks can create multiple forks in the system, and nodes can in turn work on multiple forks (branches) at the same time, thus increasing the number of forks in the system exponentially, which will considerably slow down the consensus speed and increase the risk of double-spending.

Some conventional methods, e.g. disclosed in the non-patent literature of Buterin, V. (2014, January) Slasher: A Punitive Proof-of-Stake Algorithm, available under https://blog.ethereum.org/2014/01/15/slasher-a-punitive-proof-of-stake-algorithm/involve penalizing miners if they simultaneously create blocks on multiple forks or voting on the "wrong" fork. This is done by holding some deposit of the miners for a period and allowing the reclamation only if no misbehaviour is detected and reported. For example, Slasher 1.0 as disclosed herein delays the reward claiming by locking the reward for some number of blocks. The reward and possibly some deposit can be destroyed whenever the misbehaviour is detected and is included in the blockchain before the claiming point.

SUMMARY

In an embodiment, the present invention provides a method for signing a new block of a blockchain of a distributed blockchain consensus network (DBCN), comprising a mining computing entity (MCE) and a node computing entity. The method includes the step of signing and/or encrypting of predefined MCE information by the MCE using a secret key of a public key/secret key key pair of the MCE to obtain hidden information (HI). The new block is signed by the MCE using the secret key and block information comprising block height information to create a signature for the new block. In a case of at least one further signing of a different block with the respective same block height information by the MCE, reveal information is provided to reveal the HI to the DBCN by another node computing entity of the DBCN when the node computing entity has received two signatures comprising the same corresponding block height information.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention recognize that the conventional methods only add or provide disincentives but cannot completely prevent misbehaviour. Namely, they may only stop opportunistic attacks, but not those targeted attacks that intend to manipulate transactions. This is the case since these conventional methods only cost the malicious nodes losing their deposits or rewards which in some cases comparing to what they can gain, e.g., double-spend some transactions that involves huge amount of stake or transactions with important assets.

One of the problems addressed by embodiments of the present invention is therefore to further discourage nodes of the DBCN from using multiple blocks on one fork. One of the further problems addressed by embodiments of the present invention is to discourage nodes of the DBCN from using a block on multiple forks. One of the further problems addressed by embodiments of the present invention is to enhance security, to at least reduce double spending attacks and to increase the efficiency of the system.

In an embodiment the present invention provides a method for signing a new block of a blockchain of a distributed blockchain consensus network, 'DBCN', comprising a mining computing entity, 'MCE', and a node computing entity said method comprising the steps of:
  i. At least one of signing and/or encrypting of predefined MCE information by said MCE, using a secret key of a public key/secret key key pair of said MCE to obtain hidden information, 'HI',
  ii. Signing a new block by said MCE using said secret key and block information comprising block height information to create a signature for said new block,
  iii. In case of at least one further signing of a different block with the respective same block height information by said MCE, providing reveal information to reveal said HI to said DBCN by another node computing entity of said DBCN when said node computing entity has received two signatures comprising the same corresponding block height information.

In a further embodiment the present invention provides a decentralized blockchain consensus network 'DBCN', comprising at least one mining computing entity, 'MCE', and a node computing entity, said MCE being adapted to:
  i. At least one of signing and/or encrypting of predefined MCE information using a secret key of a public key/ secret key key pair of said MCE, to obtain hidden information, 'HI',
  ii. Sign a new block using said secret key and block information comprising block height information to create a signature for said new block,
  And said node computing entity being adapted to:
  iii. provide reveal information to reveal said HI to said DBCN when having received two signatures comprising the same corresponding block height information in case of at least one further signing of a different block with the respective same block height information by said MCE.

In a further embodiment the present invention provides a mining computing entity, 'MCE' for signing a new block in a distributed blockchain consensus network, 'DBCN', adapted to:
At least one of signing and/or encrypting of predefined MCE information using a secret key of a public key/secret key key pair of said MCE, to obtain hidden information, 'HI',
  i. Sign a new block using said secret key and block information comprising block height information to create a signature for said new block.

In a further embodiment the present invention provides a node computing entity in a distributed blockchain consensus network, 'DBCN', being adapted to provide reveal information to reveal hidden information, 'HI', of a mining computing entity, 'MCE' to said DBCN when having received two signatures of the same corresponding block height information in case of at least one further signing of a different block with the respective same block height information by said MCE.

In a further embodiment the present invention provides a method for signing a new block of a blockchain in a distributed blockchain consensus network, 'DBCN' by a mining computing entity, 'MCE', comprising the steps of:
  a) At least one of signing and/or encrypting of predefined MCE information using a secret key of a public key/ secret key key pair of said MCE, to obtain hidden information, 'HI',
  b) Signing a new block by said MCE using said secret key and block information comprising block height information to create a signature for said new block.

In a further embodiment the present invention provides a method for revealing hidden information in a distributed blockchain consensus network, 'DBCN' by a node computing entity of said network, wherein reveal information is provided to reveal a hidden information of a mining computing entity, 'MCE' to said DBCN when having received two signatures of the same corresponding block height information in case of at least one further signing of a different block with the respective same block height information by said MCE.

In a further embodiment the present invention provides a non-transitory computer readable medium storing a program causing a computer to execute a method for signing a new block of a blockchain of a distributed blockchain consensus network, 'DBCN', comprising a mining computing entity, 'MCE', said method comprising the steps of
  i. At least one of signing and/or encrypting of predefined MCE information, by said MCE using a secret key of a public key/secret key key pair of said MCE to obtain hidden information, 'HI',
  ii. Signing a new block by said MCE using said secret key and block information comprising block height information to create a signature,
  iii. In case of at least one further signing of a different block with the respective same block height information by said MCE, providing reveal information to reveal said HI to said DBCN by another node computing entity of said DBCN when said node computing entity has received two signatures of the same corresponding block height information.

In a further embodiment the present invention provides a non-transitory computer readable medium storing a program causing a computer to execute a method for signing a block of a blockchain in a distributed blockchain consensus network, 'DBCN' by a mining computing entity, 'MCE', comprising the steps of
  a) At least one of signing and/or encrypting of predefined MCE information using a secret key of a public key/secret key key pair of said MCE, by said MCE to obtain hidden information, 'HI',
  b) Signing a new block by said MCE using said secret key and block information comprising block height information to create a signature.

In a further embodiment the present invention provides a non-transitory computer readable medium storing a program causing a computer to execute a method for revealing hidden information wherein reveal information is provided to reveal a hidden information of a mining computing entity, 'MCE' to a distributed blockchain consensus network when having received two signatures of the same corresponding block height information in case of at least one further signing of a different block with the respective same block height information by said MCE.

In other words an embodiment of the present invention enables a secure virtual mining for blockchains, in particular by binding the block height information to the block signature.

At least one embodiment of the present invention may have the advantage of discourage nodes in the blockchain network to mine multiple block on one fork. At least one embodiment of the present invention may have the advantage to discourage nodes to mine blocks on multiple forks. At least one embodiment of the present invention may have the advantage to reveal the identity of a misbehaving or attacking node in the DBCN. At least one embodiment of the present invention may have the further advantage of increasing the efficiency of the computational resources of the blockchain network and increasing the security in the blockchain network.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

The terms "computing entity" and "computing device" refer in particular in the claims, preferably in the specification each to a device adapted to perform computing like a personal computer, a tablet, a mobile phone, a server, or the like and comprises one or more processors having one or more cores and may be connectable to a memory for storing one or more applications which is/are adapted to perform corresponding steps of one or more of the embodiments of the present invention. Any application may be software-based and/or hardware-based installed in the memory on which the processor(s) can work on. The devices, entities or the like may be adapted in such a way that the corresponding steps to be computed are performed in an optimized way. For instance different steps may be performed in parallel with a single processor on different of its cores. Further the entity/device may be identical forming a single computing device. The device(s)/entity(ies) may also be instantiated as a virtual device running on a physical computing resource. Different devices/entities may therefore be executed on said physical computing resource.

The term "computational resource" is to be understood in its broadest sense and refers in particular in the claims, preferably in the specification to any kind of physical and/or virtual computational or compute resource, resource, device, entity or the like adapted to perform computing and which can be used by applications, services, users, etc. to perform certain functions, services, applications or the like. A computational resource may include but is not limited to computes, networks, memories, storages, etc. For instance a compute resource may be a CPU resource that is part of the servers inside the datacenter. Thus a server can have Compute like CPU (or vCPU), Network like Network Interface card (NIC), Memory like RAM and/or Storage like external/internal HDD(s).

The term "decentralized blockchain consensus network" is to be understood in the most general sense and refers in particular in the claims, preferably in the specification to a network having a plurality of nodes providing decentralized storage among said participating nodes in the network. Each node has preferably a copy either a light version or a full version of the chain of blocks, wherein each block may be a closed ledger to agree universally on the data status.

The term "blockchain" is to be understood, in particular in the claims, preferably in the description as a distributed database maintaining a continuously growing list of data records that are hardened against tampering and revision even by operators of the data storing nodes hosting database. A blockchain comprises for example two kinds of records: so-called transactions and so-called blocks. Transactions may be the actual data to be stored in the blockchain and blocks may be records confirming when and in what sequence certain transactions became journaled as a part of the blockchain database. Transactions may be created by participants and blocks may be created by users who may use specialized software or equipment designed specifically to create blocks. The term "blockchain" is e.g. identical to the Bitcoin blockchain as a digital currency was introduced in 2008.

The term "mining" with regard to a "block" is to be understood in the most general sense and refers in particular in the claims, preferably in the specification to a distributed computational review process performed on each "block" of data in a "blockchain". This allows for achievement of consensus in an environment where neither party knows or trusts each other. "Mining" is performed by a "miner".

The term "signing" with regard to a "block" is to be understood in the most general sense and refers in particular in the claims, preferably in the specification to data in electronic form being associated with linked or connected to other data in electronic form and being used by the computing entity to sign.

The term "miner" is to be understood in the most general sense and refers in particular in the claims, preferably in the specification to an individual, person, user or the like who runs a computing entity to repeatedly calculate hashes with the intention to create a successful block and to earn coins from transaction fees and new coins created with the block itself.

The term "block information" is to be understood in the most general sense and refers in particular in the claims, preferably in the specification to information related, describing or specifying information of properties of a block of a blockchain.

The term "block height information" is to be understood in the most general sense and refers in particular in the claims, preferably in the specification to information related to, describing or specifying the height of a block of a blockchain.

The term "hidden information" is to be understood in the most general sense and refers in particular in the claims, preferably in the specification to encrypted or somehow private information related to, describing, specifying or at least enable to draw conclusions about the identity of user using the mining computing entity for signing.

The term "reveal information" with regard to hidden information is to be understood in the most general sense and refers in particular in the claims, preferably in the specification to information enabling to reveal the hidden information. For instance, reveal information may be provided in form of the secret key used to encrypt the information forming the hidden information: Using the secret key—reveal information—enables decrypting of the encrypted hidden information.

The term "witness-hiding protocol" is to be understood in the most general sense and refers in particular in the claims preferably in the specification to a two-party protocol, in which verifier cannot learn any witness from the protocol which works as follows: A prover and a verifier see a common input x, and the prover has a secret auxiliary input: a witness w from the witness set w(x). Purpose of the prover is to perform a computational task that would be difficult to perform had the prover not known w. Typical examples are to give an interactive proof that he "knows" a witness to the NP statement x (in this case w may be the NP witness), or to digitally sign messages which can later be checked by the public key x (in this case w is the prover's private key). A witness-hiding protocol in e.g. disclosed in the non-patent literature of Feige U. et al.: "Witness Indistinguishable and Witness Hiding Protocols", 1990, ACM 089791-361-2/90/0005/0416.

Further features, advantages and further embodiments are described or may become apparent in the following:

Said HI may be revealed by revealing the secret key of said MCE. This allows an easy way to provide information with which the hidden information can be for example decrypted to obtain information related to the miner or user respectively.

Said HI may comprise identity information of the MCE and/or a user of said MCE.

This allows an easy way to identify the user behind the mining computing entity using said MCE for misbehavior like an attack on the blockchain.

Said HI may be checked for correctness by at least one of:
A) linking said HI to an identity provider and/or an electronic identity certificate using a witness hiding protocol,
B) using a trusted third party during registration of said MCE to said DBCN,
C) using a trusted execution environment entity during registration of said MCE to said DBCN.

This enables in a flexible way to check for correctness of the hidden information HI.

Said signature generated in step b) may be computed using a discrete logarithm signature scheme and a nonce. The discrete logarithm signature scheme enables an efficient way to use the secret key of the user for signing and for encrypting predefined information which can be revealed in case of misbehaving.

Said nonce may be correctly computed using a pseudo-random function on input of said secret key and said block height said information. This enables to compute a correct nonce in an easy way to obtain a signature leaking the secret key in case of double-signing blocks of the same height.

A witness hiding proof for correct computation of said nonce may be computed by said MCE. This allows in a secure way to obtain approval for correct computation of the nonce.

In the following FIGS. 1-4 a public blockchain model is assumed. The blockchain network comprises a plurality of distributed nodes, who run a client application for peer-to-peer connection(s). The transactions are broadcasted into the blockchain network for public validation; each mining node then organizes the validated transactions into blocks, and mines the next legitimate block to be included into the blockchain. The mining protocol, which is executed by all miners and validated by all nodes, brings consensus to the transaction history in this distributed system. Miners may join and leave at any time in the process or the blockchain network respectively.

Figure 1:
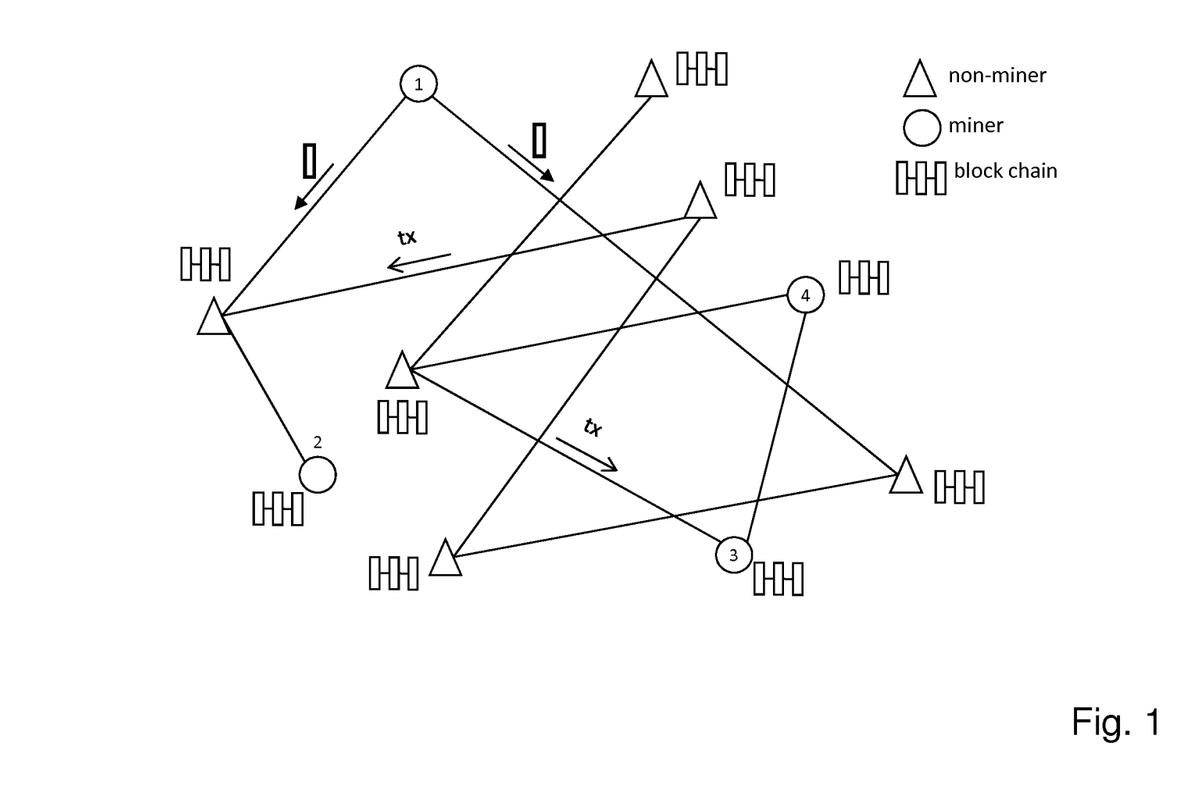
FIG. 1 shows steps of a method according to an embodiment of the present invention.

FIG. 1 shows a blockchain network with miners and non-miners. The current length of the block chain is 3, minor #1 has just mined new block of the blockchain.

Further it is assumed that all nodes first submit some important information signed or encrypted with their key pairs in order to register to the blockchain network. During registration of the miner, an encrypted information string is provided, that will be disclosed to the blockchain network in the case of double signing of the miner. Further, the signature scheme used by the miner to confirm a block is designed in a way such that the registered private key is revealed in case the miner signs contradicting blocks. Using the cryptographic approach, the information that is revealed by using the registered private key can be chosen very flexibly and be e.g. the identity of the signer.

In the registration phase for registering a mining computing entity to said blockchain network, an encrypted information string or a digital signature is provided. The encryption information or the digital signature may be come along with a proof that once the private key used to decrypt or sign the registered information is disclosed, the miner will for example bear huge consequences: For instance, the encrypted information can be the true identity of the node, and the digital signature can be signed over an important contract. Therefore, once the private key is revealed, the true identity of the misbehaved node will be disclosed or he will lose the control of the contract.

The submitted information can be checked for correctness, e.g. the correct identity Encx(UserID) by one of the following procedures 1. Linking the submitted information to an Identity Provider or electronic identity certificate via a witness-hiding protocol.
2. Availability of a trusted third party during registration process.
3. Availability of a temporary secure hardware during the registration process that can perform the encryption of the submitted information in a trusted manner.

For providing a block signature conventional methods are typically based on one-time signatures. However this is not a viable method for providing signatures with reveal information for revealing hidden information in case of misbehaviour. According to FIG. 1 this is achieved by using a discrete logarithm (DLOG)-based signature scheme, where a nonce is chosen pseudo-randomly. Said signature comprises of a conventional DLOG-based signature together with a proof of correct choice of the nonce.

In detail:

The miner aiming to sign a block with block height=n has to be signed using a nonce that is pseudo-randomly derived from the height n of the chain the current block belongs to and a user-related fixed secret, e.g. the secret signing key.

The miner furthermore needs to create a witness-hiding proof that the chosen nonce in the signature scheme fulfils the given requirement.

All miners check that the signature is correct and contains all necessary elements (proofs). If two signatures from the miner are detected for the same block height, the secret signing key is extracted and used to reveal the registered private string of the miner.

A conventional DLOG-based signature is defined to be r,s with $r = g^k \pmod{p}, s = (H(m) - x \cdot r) \cdot k^{-1}$ for a random r, the secret signing key x, the message m and a hash function H as well as a prime p and g being a generator of the multiplicative group of integers modulo p.

To obtain a signature that leaks the secret key x in case of double signing blocks on the same height n, the nonce k is derived by a pseudo-random function PRF as $k = PRF(\text{secret key } x \| \text{block\_height } n)$ The miner can add a non-interactive witness hiding proof for the correct computation of the nonce k. Several suitable schemes are known in the literature as e.g. disclosed in the non-patent literature of Cramer, R. I. (1994): "Proofs of partial knowledge and simplified design of witness hiding protocols" (Annual International Cryptology Conference).

All miners accept the signature, only if the accompanying proof for the formation of the nonce k is also correct. If two signatures of the same block height and therefore the same k are found—i.e. a misbehaviour is detected—the secret key x is revealed by solving the following two equations for the two unknown variables x and k:

$s_1 = (H(m_1) - x \cdot r) \cdot k^{-1}$ $s_2 = (H(m_2) - x \cdot r) \cdot k^{-1}$ Then anyone can compute the secret key x and thus revealing the hidden information about the miner that was given in the Registration phase.

Figure 2:
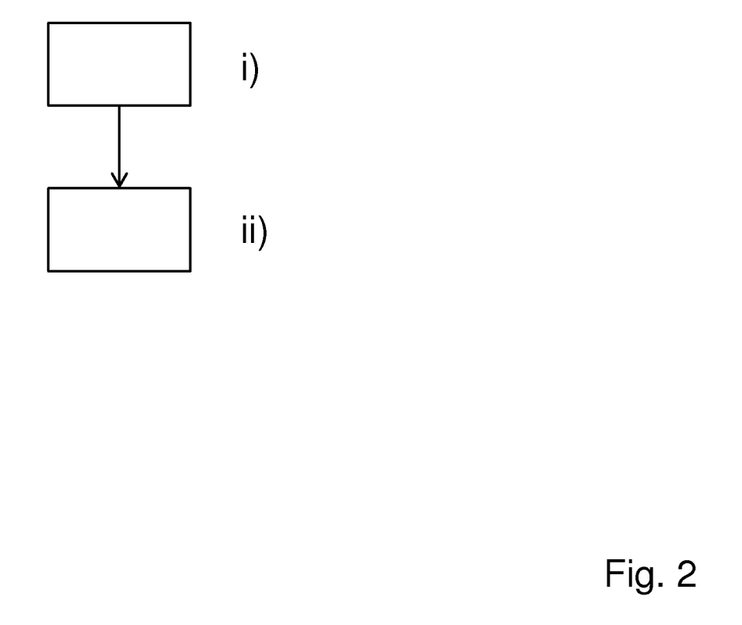
FIG. 2 shows steps of a method according to an embodiment of the present invention.

FIG. 2 shows steps of a method according to an embodiment of the present invention.

In FIG. 2 steps of a method for signing a new block of a blockchain of a distributed blockchain consensus network, 'DBCN', is shown comprising a mining computing entity, 'MCE', and a node computing entity said method comprising the steps of i. At least one of Signing and/or encrypting of predefined MCE information by said MCE, using a secret key of a public key/secret key key pair of said MCE to obtain hidden information, 'HI',
ii. Signing a new block by said MCE using said secret key and block information comprising block height information to create a signature for said new block,
iii. In case of at least one further signing of a different block with the respective same block height information by said MCE, providing reveal information to reveal said HI to said DBCN by another node computing entity of said DBCN when said node computing entity has received two signatures comprising the same corresponding block height information.

Figure 3:
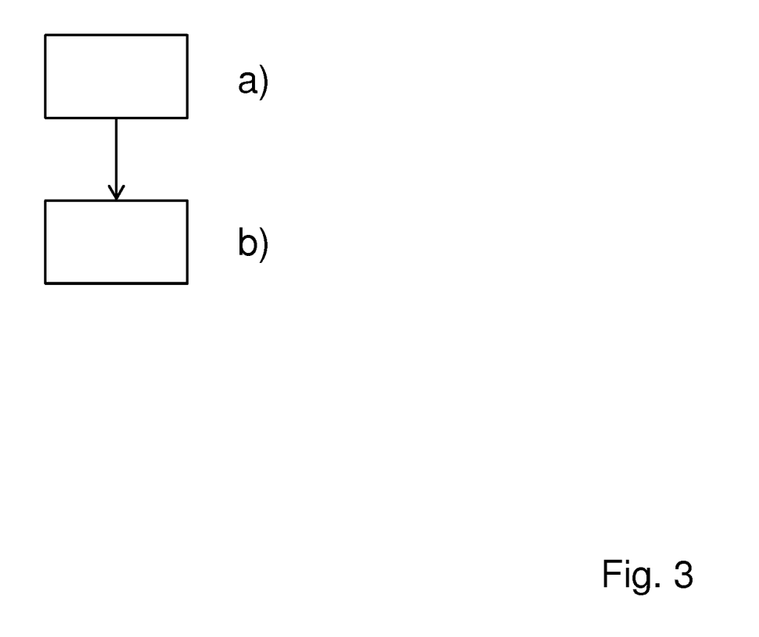
FIG. 3 shows steps of a method according to an embodiment of the present invention.

FIG. 3 shows steps of a method according to an embodiment of the present invention.

In FIG. 3 steps of a method for signing a new block of a blockchain in a distributed blockchain consensus network, 'DBCN' by a mining computing entity is shown, 'MCE', comprising the steps of a) At least one of signing and/or encrypting of predefined MCE information using a secret key of a public key/secret key key pair of said MCE, to obtain hidden information, 'HI',
b) Signing a new block by said MCE using said secret key and block information comprising block height information to create a signature for said new block.

Figure 4:
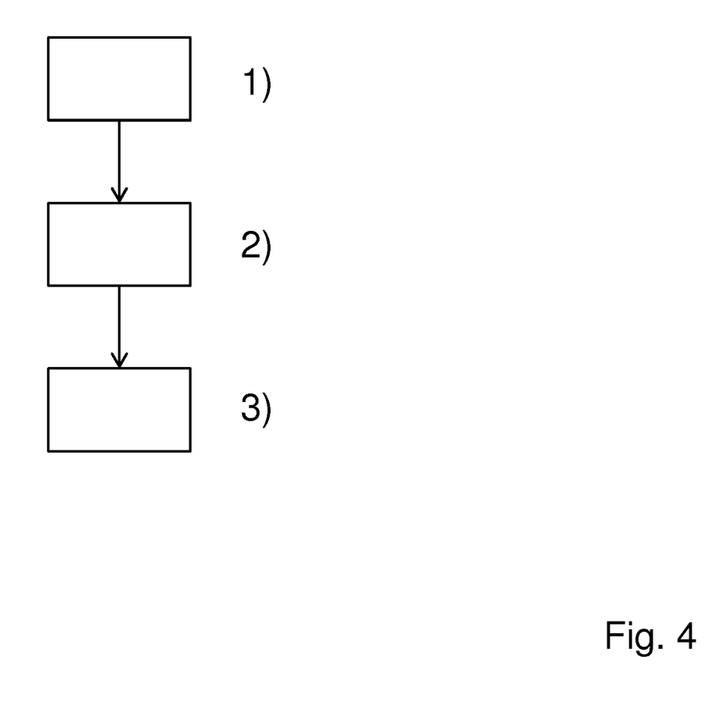
FIG. 4 shows steps of a method according to an embodiment of the present invention.

FIG. 4 shows steps of a method according to an embodiment of the present invention.

In FIG. 4 a method is shown comprising the steps of:

1) Registering the signature key with a key registration center and publishing the according public key of the signature scheme with the property to leak pre-defined information in case of signing messages on the same height.
2) Using the signing Algorithm to sign a block where the signing algorithm obtains the message, the secret key and the block height as a separate parameter and creates a signature.
3) The new block is broadcasted to the network and all nodes validate the new block according to the consensus protocol, which includes verifying the signature.

In summary, embodiments of the present invention provide or enable:

1. Using a signature scheme that obtains the block height as a separate parameter.
2. Publicly reveal pre-defined information just by signing double signing different messages with the same block height, but not when messages with a different block height are signed.
3. Using a DLOG-based signature scheme where the secret key can be used for signing and encrypting information.
4. Restricting the signer in freedom of nonce generation and combining the signature with a proof of correct nonce computation.

The present invention, in particular at least one embodiment, discourages misbehaving nodes from performing an attack by revealing their full identity in the blockchain network.

Conventional methods for virtual mining may only stop opportunistic attacks, but not those targeted attacks that intend to manipulate the transactions. This is the case since these conventional methods only cost the malicious nodes losing their deposits or rewards, which in some cases comparing to what they can gain, e.g., double-spend some transactions that involves huge amount of stake or transactions with important assets.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for signing a new block of a blockchain of a distributed blockchain consensus network (DBCN) comprising a mining computing entity (MCE) and a plurality of node computing entities, the method comprising:
   i. signing and/or encrypting of predefined MCE information by the MCE, using a secret key of a public key/secret key key pair of the MCE to obtain hidden information (HI);
   ii. signing the new block by the MCE using the secret key and block information comprising block height information to create a signature for the new block;
   iii. signing of a second block by the MCE with the same block height information as the new block; and
   iv. providing, by a first node computing entity of the plurality of node computing entities, reveal information to reveal the HI to a second node computing entity of the plurality of node computing entities when the first node computing entity receives two signatures comprising the same block height information, wherein the two signatures are associated with the new block and the second block.

2. The method according to claim 1, wherein the HI is revealed by revealing the secret key of the MCE.

3. The method according to claim 1, wherein the HI comprises identity information of the MCE and/or of a user of the MCE.

4. The method according to claim 1, wherein the HI is checked for correctness by at least one of:
   a) linking the HI to an identity provider and/or an electronic identity certificate using a witness-hiding protocol,
   b) using a trusted third party during registration of the MCE to the DBCN, and
   c) using a trusted execution environment entity during registration of the MCE to the DBCN.

5. The method according to claim 1, wherein the signature is computed using a discrete logarithm signature scheme and a nonce.

6. The method according to claim 5, wherein the nonce is computed using a pseudo-random function on input of the secret key and the block height information.

7. The method according to claim 5, wherein a witness hiding proof for the nonce is computed by the MCE.

8. A decentralized blockchain consensus network (DBCN) comprising:
   at least one mining computing entity (MCE) configured to:
      i. sign and/or encrypt predefined MCE information using a secret key of a public key/secret key key pair of the MCE, to obtain hidden information (HI), and
      ii. sign the new block using the secret key and block information comprising block height information to create a signature for the new block;
      iii. signing of a second block with the same block height information as the new block;
   a plurality of node computing entities, comprising:
      a first node computing entity configured to:
      iv. provide reveal information to reveal the HI to a second node computing entity of the plurality of node computing entities when the first node computing entity receives two signatures comprising the same block height information, wherein the two signatures are associated with the new block and the second block; and
      the second node computing entity configured to:
      v. receive the reveal information.

9. A mining computing entity (MCE) for signing a new block in a distributed blockchain consensus network (DBCN), the MCE being configured to:
   i. sign and/or encrypt predefined MCE information using a secret key of a public key/secret key key pair of the MCE, to obtain hidden information (HI); and
   ii. sign the new block using the secret key and block information comprising block height information to create a signature for the new block.

10. A first node computing entity in a distributed blockchain consensus network (DBCN), the first node computing entity being configured to:
   provide reveal information to reveal hidden information (HI) of a mining computing entity (MCE) to a second node computing entity of the DBCN when having received two signatures comprising block height information, wherein the two signatures are associated with a new block and a second block.

11. A method for signing a new block of a blockchain in a distributed blockchain consensus network (DBCN) by a mining computing entity (MCE), the method comprising:
 a) signing and/or encrypting of predefined MCE information using a secret key of a public key/secret key key pair of the MCE, to obtain hidden information (HI); and
 b) signing the new block by the MCE using the secret key and block information comprising block height information to create a signature for the new block.

12. A method for revealing hidden information in a distributed blockchain consensus network (DBCN) by a first node computing entity of the network, the method comprising:
 providing reveal information to reveal a hidden information (HI) of a mining computing entity (MCE) to a second node computing entity of the DBCN when having received two signatures comprising same corresponding block height information, wherein the two signatures are associated with a new block and a second block.

* * * * *